Oct. 24, 1972     K. HABERHAUER ET AL     3,700,513
METHOD OF MAKING TUBE

Filed Sept. 18, 1969     3 Sheets-Sheet 1

Inventors
KARL HABERHAUER
MANFRED JUTZI
BY   REINHOLD KIESS

Strauch, Nolan, Neale, Nies & Kurz
ATTORNEYS

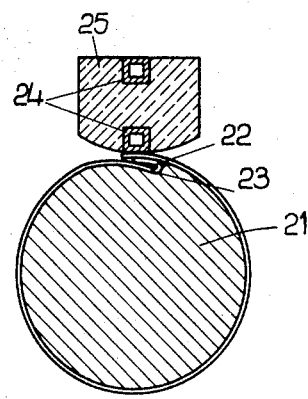
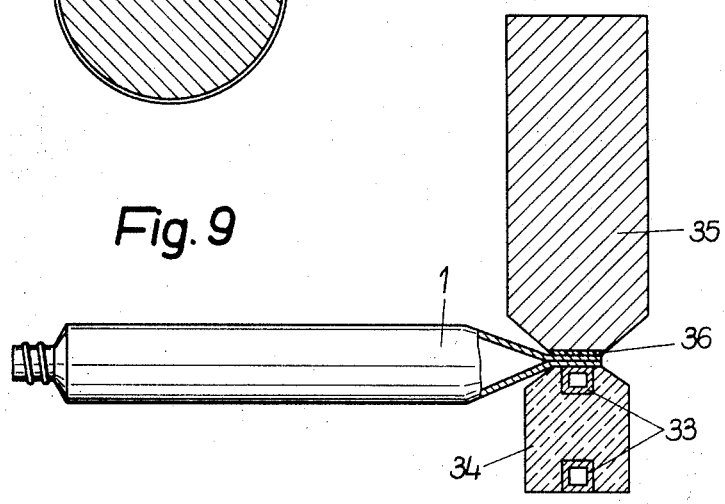
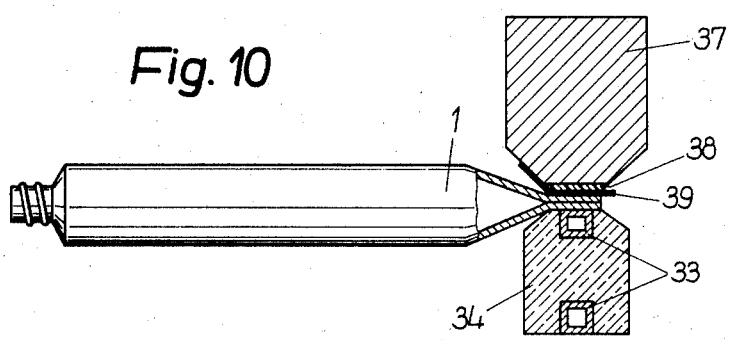

United States Patent Office 3,700,513
Patented Oct. 24, 1972

3,700,513
METHOD OF MAKING TUBE
Karl Haberhauer, Upper Palatinate, Manfred Jutzi, Alt-Leiningen, and Reinhold Kiess, Eisenberg, Germany, assignors to C. F. Spiess & Sohn
Filed Sept. 18, 1969, Ser. No. 858,958
Int. Cl. B29c 27/02
U.S. Cl. 156—69                   3 Claims

ABSTRACT OF THE DISCLOSURE

A container tube comprises a tubular body and a prefabricated head secured upon one end of said body. The body may be formed by wrapping a plastic laminated foil sheet about a spindle, or it may be a length of extruded plastic tubing. The body has an inturned shoulder terminating in an edge that is embedded or otherwise so disposed as to be protected against contact with the tube contents. The tube has a welded longitudinal seam wherein the edges are shielded from contact with the tube contents. Welding heat and pressure are provided by an induction coil mounted in a non-metallic member adapted to press the junctures to be fused against a high heat conductive support such as a metal spindle or block.

---

This invention relates to container tubes the bodies of which are formed from sheet material, particularly laminated foils, or from extruded plastic tubing, and the formed bodies connected to a prefabricated dispensing head structure. The invention also relates to methods and apparatus for the production of such tubes.

Tubes have been proposed wherein the tube body is formed from foils or tubing connected to a headpiece. In a known tube, the headpiece is fabricated during attachment to the tube body. The method of production of such tubes is comparatively difficult and expensive because an end of the formed tube body must be inserted into an extrusion die and secured to the tube head during formation of the head. The injected liquid plastic must solidify within the mold and at the same time attach itself to the body. In other known types of tubes, a prefabricated tube head is inserted into or telescoped over one end of a formed tube body and attached by a layer of plastic. Prior methods of production along this line are relatively difficult and expensive.

In the foregoing methods of production, other disadvantages occur. The formed tube bodies must correspond accurately at the periphery with the mold because the air gap between the mold parts must be sealed to such an extent that liquid plastic injected under high pressure will fill only a prescribed space. On the other hand, the enclosed air must escape from the mold. Trapped air bubbles in the plastic as well as insufficiently sealed connections between the head and body may result and the weakened tube structure is often unusable.

Dimensions of extruded and like prefabricated tubing can be maintained only with great difficulty within required tolerances, and the body of a tube made from a sheet of foil present difficult sealing problems because of the longitudinal seam. Elastic means, such as silicon rubber and the like, are proposed in an attempt to solve the sealing problem. However, highly heat resistant parts are only slightly resilient and do not withstand the wear loads, so that these proposals have not been successful.

The invention is based on the problem of creating a tube structure having a safe and firm connection between the tube body and the tube head, as well as methods and apparatus for production, that will make possible relatively simple and inexpensive and uniform mass production, and solution of this problem is the major object of the invention.

The invention contemplates assembly of the tube from separately prefabricated parts in such manner that, at the upper end of the tube body, the tube body wall made of foil or extruded tubing is formed to provide a shoulder on the tube body and is firmly connected as by a welding or fusion process with a corresponding shoulder on the formed headpiece so that the edge of the tube wall is covered with respect to the tube interior.

Thus a particular advantage of the invention is that the front edge of the tube wall is so covered or enclosed within the tube that it does not come into contact with the contents of the tube. This is of particular significance when the tube is made of composite or laminated material containing a metal layer that is impermeable by aromatic substances or ultraviolet radiation for example. The exposed edge of this metal layer is covered by plastic inside the tube structure. This structure eliminates a point of attack for separation of the tube head from the tube body due to pressures exerted on or by the contents of the tube.

For connecting the tube head and the tube body wall, there are several arrangements disclosed by way of example. In one embodiment at the upper end of the tube body, the tube wall formed from foil or tubing is clamped between an integral shoulder plate on the prefabricated headpiece and an additional shoulder element, whereby the shoulder plate, the clamped-in end portion of the tube wall and the additional shoulder element are unitarily welded together at their coextensive surfaces. The additional shoulder element may be inside or outside shoulder of the tube. In a further embodiment, at the upper end of the tube body the tube wall extends beyond the body shoulder within the nipple of the headpiece and its coextensive surfaces are firmly bonded with the head shoulder plate and the head nipple. Also where the tube body wall extends within the head nipple it is bonded between the inside surface of the head nipple and a bushing insert.

The tube body itself may be formed from a sheet of foil, preferably a composite foil, with a longitudinal seam, whereby one side edge is formed with a folded border turned to the outside end over which border the other foil edge extends, and the overlapped edges unitarily bonded with one another. In this manner it is assured that no cut or raw edges of the foil open toward or are exposed to the inside of the tube. This is particularly essential when the tube body is formed from a metal foil coated on one or on both sides with plastic.

For the production of the tube according to the invention, a process is particularly suitable in which the tube body formed from foil or tubing is placed on a spindle and reduced in diameter at one end to form the tube shoulder region and in some instances a nipple on the tube. A prefabricated headpiece is placed on the end of the formed body, and then the end of the tube body is welded under heat and pressure to the coextensive surface of the head shoulder and/or the head nipple. This method of production is simple and inexpensive. Also, it can be carried out particularly efficiently using a tube body formed from foil or tubing. For accomplishing this one can inturn the tube body at one end over an annular shoulder element mounted on the spindle to form a tube shoulder, place the prefabricated headpiece on the spindle to clamp the tube shoulder on the spindle, and then weld the tube and head shoulders together. One can also inturn the tube body wall at one end over the shoulder of a headpiece placed on the spindle and, after placing an annular outside shoulder element thereon, weld the parts together. Also, the invention contemplates forming a nipple on the tube body end, inserting it into the head nipple, and lining both nipples with a thermoplastic bushing, and subsequently welding the assembly together at all contacting surface areas.

If the tube body is to be produced from a blank or sheet of foil, such as composite foil, one can turn the foil blank along one longitudinal edge to a narrow border, wrap the foil blank around a spindle with the opposite smooth edge over the border, and then weld the seam along the overlap. It is also within the frame of the invention to weld the tube body shut at the end opposite the tube head along a transverse seam. If the tube body has been provided with a longitudinal welded seam, such can be arranged in the middle of the cross seam. Difficulties are encountered in the case of composite foils, such as a foil consisting of polypropylene-paper-aluminum-polypropylene in laminations. Such tubes are used where the contents have special requirements with regard to diffusion. In order to adequately weld such a foil a higher temperature is required than in the case of polyethylene for example. On the other hand the paper cannot withstand excessively high temperature. It is immaterial whether welding is done by the heat contact process, the induction welding process or some equivalent process. According to the invention, however, the areas of the tube body immediately adjoining the welding areas are cooled during the welding process. As a result, the invention offers the possibility of avoiding damage to the tube body due to overheating by the welding process even under difficult conditions.

The induction welding process is particularly suitable for the production of laminated wall tubes. The heat necessary for the welding process is produced in the metal layer of the tube body. A device is provided which allows heat to develop only in the welding zone and prevents or limits draining off of the heat into the tube body. This is achieved by providing an induction loop adapted to suit the pertinent welding places, which loop can be embedded in plastic or in some other electrically nonconductive material, the tube body is supported in heat transmitting contact with an element that has high heat conductivity and a high heat capacity. In this manner a secure welding of the tube elements can be accomplished. Through the high heat capacity of the element supporting the tube body, the necessary heat for welding will become effective over the entire surface areas to be bonded but will be taken off immediately at the edges of these surfaces by the element supporting the tube body, so that even in the immediate vicinity of the welding surface no combustion damage occurs on the tube body.

This basic principle is maintained in the case of all welding installations of the production device. Thus, for example the installation for welding of tube head on the tube body may contain an induction coil extending axially of the tube body, a pressure die for pressing the headpiece onto the tube body and a spindle carrying the tube body. The spindle is made of metal, preferably aluminum, and carries on one end a forming shoulder made of polytetrafluoroethylene whereby the metal surface of the spindle extends to the base edge of the formed shoulder of the tube body. In this manner it is assured that the temperature in the surface area that is to be welded will be relatively high in order to achieve a safe welding of the tube body and the tube heated, while in the immediate vicinity, that is to say, at the base edge of the shoulder of the tube, heat is drained off by the spindle so that no combustion phenomena occurs on the material of the tube body.

For the production of tubes made of foil blank, the device may contain an induction loop extending across the length of the tube body, a heated pressure die likewise extending across the entire length of the tube body and a spindle on which is wrapped the foil blank The spindle is made of good heat conducting material and great heat capacity, and it has a flat longitudinal groove extending axially for the reception of a turned over edge of the blank. Thus in the area of the longitudinal seam of such a tube, a safe and firm welding takes place and no damaging combustion phenomena appears at the welded seam.

If in the production of the tube according to the invention the end of the body of the tube away from the tube is to be closed with a cross seam, then the apparatus contains a pressure die mounting an induction loop extending over the entire width of the tube, and an opposed pressure support of high heat conductive high heat capacity material.

Several embodiments of the invention are explained in detail in the following specification and illustrated in the drawings wherein:

FIG. 6 is a transverse section showing schematically forming the longitudinal seam of a tube body from a foil blank;

FIG. 9 is a mainly sectional view showing an arrangement for welding the bottom of the tube closed; and FIG. 10 is a mainly sectional view showing another arrangement for welding the bottom of the tube closed.

PREFERRED EMBODIMENTS OF INVENTION

Figure 1:
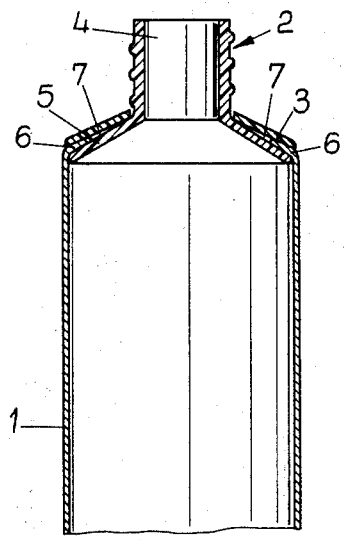
FIG. 1 is a fragmentary view in longitudinal section showing the upper part of a tube body and the head of the tube in one embodiment.

As shown in FIG. 1, the tube may consist essentially of a tube body 1, a tube head 2 and an additional shoulder element 3.

Tube body 1 may be composed of multilayered or composite material. For example, the body walls may be laminations of polyethylene, aluminum, paper and polyethylene, with the inner and outer layers of polyethylene as will be explained further in connection with FIG. 6. Instead of the one or the other of the two outer polyethylene layers, outer layers made of polypropylene, polyester, polyolefin or an equivalent plastic may be provided. It is possible to form the body of the tube from single or multilayered plastic tubing.

Tube head 2 is preferably extruded as a preshaped element from a thermoplastic synthetic material. In FIG. 1 it comprises a nipple 4 and a downwardly and outwardly inclined shoulder plate 5. Shoulder plate 5 extends across the entire cross section of the tube body as shown. The additional shoulder element 3 is preformed as a conical ring whose central opening corresponds to the outside diameter of nipple 4, while the outside periphery of ring 3 equals the substantially final outer shoulder circumference of the tube body. The conicity of shoulder element 3 corresponds essentially to the conicity of tube head shoulder plate 5.

The upper annular shoulder region 6 of the tube body, as shown in FIG. 1, is turned inwardy to overlie the upper surface of tube head shoulder plate 5. This shoulder region may extend only part way toward the nipple as in FIG. 1 or all the way as in FIG. 3. Annular shoulder element 3 externally overlies the tube body upper shoulder region 6 and extends substantially to the root of nipple 4. The entire assembly of body, nipple and shoulder element is welded together so that the spaces 7, which are shown in FIG. 1, disappear practically completely in the finished product wherein shoulder plate 5, the turned in shoulder region 6 of tube body 1 and the external shoulder element 3 are welded or fused together into one piece. In the illustration of FIG. 1, the upper shoulder region 6 of the tube body 1 is relatively narrow, but it is within the scope of the invention to provide a shoulder region 6 of a width to extend to the root of nipple 4. In any event the edge of the tube at 6 is covered up and imbedded between plate 5 and element 3, and thus is not exposed to the contents of the tube body.

Figure 2:
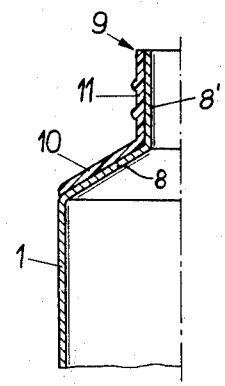
FIGS. 2-5 are similar fragmentary half-sections showing different connections between the body and head of the tube according to further embodiments.

In the embodiment of FIG. 2, the additional shoulder element 3 is not used. The tube body 1 is formed over a relatively long upper area in the shape of an annular inclined shoulder region 8 and then reduced to form a tube nipple 8'. This operation in practice can be accomplished for example with the help of a spindle inside the tube. The prefabricated tube head 9 comprises an inclined shoulder section 10 integral with an externally threaded nipple section 11. Tube head 9 fits over the formed end of the tube body with nipple 11 closely surrounding nipple 8' and shoulder 10 colsely overlying body shoulder 8. Headpiece 9 is welded or fused to the end of the tube over coextensive contacting surfaces and, since the free edge of end nipple 8' of tube body (FIG. 2) lies approximately in the plane of the open end of tube nipple 11, it is protected from contact with the contents of the tube. It is preferable, during welding of the tube body 1 within head nipple 11, to weld the adjacent top edges of head nipple 11 and body nipple 8' together to cover up these edges securely with regard to the contents of the tube, so that contact of a metal layer contained in the wall of the tube with the contents of the tube is impossible.

Figure 3:
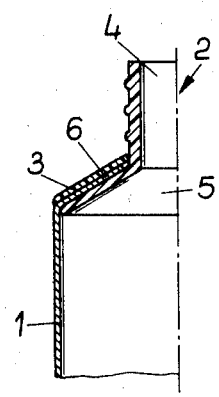

In the example of FIG. 3 the basic structure, as described in connection with FIG. 1, has been effectively maintained. However, in this example, the upper shoulder region 6 of the tube body 1 is turned in practically over the entire external surface of the shoulder 5 of head 2 and then the additional shoulder element 3 is placed over this, so that the tube body 1 extends practically up to nipple 4. The embodiments according to FIGS. 2 and 3, given by way of example, offer the particular advantage that the shoulder element 3 and possibly the tube nipple, may receive a metal insert in order to protect against diffusion of aromatic substances from the tube and against penetration of radiation, especially ultraviolet radiation, in the tube.

Figure 4:
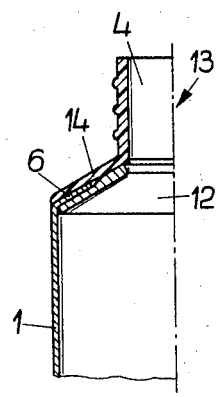

In the example of FIG. 4, the tube body 1 at its upper shoulder region 6 is drawn in over an internal generally frusto-conical annular shoulder element 12. Ring 12 has a central opening corresponding essentially to the open cross section of head nipple 4. The external periphery of shoulder element 12 is equal to the desired internal periphery of the tube body. Tube head 13 comprises nipple 4, and inclined shoulder 14 of the tube head overlies the internal shoulder element 12 and shoulder region 6 of the tube body so that when the parts are fused or welded together the edge of the tube body is fully enclosed and not exposed to the contents of the tube.

Figure 5:
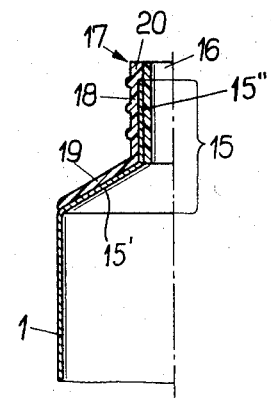

In FIG. 5, a relatively long end area 15 of tube body 1 is formed into an inclined tube shoulder 15' and a cylindrical tube nipple 15''. The prefabricated tube head 17 comprises a nipple 18 closely surrounding tube body nipple 15'' and an inclined shoulder 19 overlying tube shoulder 15'. As shown in FIG. 5 the upper edge of head nipple 17 may be formed with an internal flange appearing as a thickened ring 20 against which the upper edge of body nipple 15'' abuts. A cylindrical nipple bushing 16 of thermoplastic material lines ring 20 and tube body nipple 15''. The tube head 17 and body 1 are welded together at their coextensive portions, with the upper edge of the tube protectively enclosed against contact with the contents of the tube.

In all of the foregoing examples, the prefabricated head is integrally united with the formed tube body end and the relatively raw edges of the tube wall material are so enclosed that they are protected against contact with the contents of the tube body at all times. This holds whether the tube body is made from a foil sheet or is an extruded tube.

FIG. 6 shows a production example in which the tube body 1 made of a foil blank sheet is wrapped around a spindle 21. The foil blank preferably consists of a composite or laminated foil. For example an aluminum foil layer coated on opposite sides with an inert plastic, such as polyethylene or polypropylene is suitable.

The foil blank is turned outward first of all along one longitudinal edge to form a narrow border welt 22 and this welted longitudinal edge is inserted into a flat longitudinal groove 23 extending axially along the spindle 21 as shown in FIG. 6. Then the blank is firmly wrapped around the spindle and the opposite longitudinal edge overlapped over welt 22. The insertion of the welt into sindle groove 23 is of particular importance, because as a result of this operation the tube blank may be tightened firmly over the entire periphery of the spindle so that it will have good heat conductive contact with the entire coextensive surface of spindle 21, in order to drain off heat occurring during welding.

For this purpose spindle 21 is made of a good heat conductive material, such as aluminum, and has relatively great heat capacity, so that the heat produced at the welding seam will not drain off into the foil material of the tube body but will be conducted away by the spindle. In this manner combustion or related deterioration of the foil material during the welding process will be avoided.

In FIG. 6, a welding electrode is provided in the shape of an induction loop 24, extending along the entire length of tube body 1. Loop 24 for the purpose of cooling with water is preferably hollow. Loop 24, as also indicated in FIG. 6 is mounted on a ceramic or like non-metallic body 25 which serves also as a contact stamp in order to press the foil areas together in firm surface engagement along the longitudinal seam.

Thus, in forming the tubular body of tube 1, the laminated foil blank is wrapped around a spindle of suitable length with the seam formed and overlapped as shown in FIG. 6, and welding or fusing is accomplished by pressing the hot induction loop electrode upon the seam and if necessary moving it along the spindle length. Stamp 25 can also comprise a body of heat resistant plastic such as tetrafluoroethylene.

Figure 7:
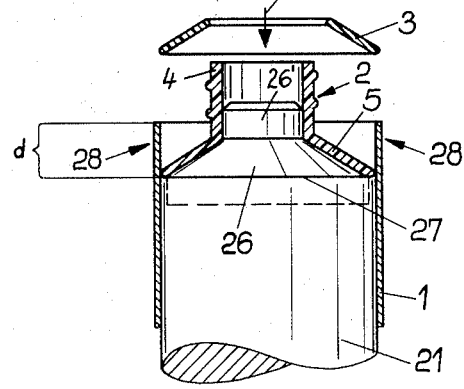
FIG. 7 is a sectional view showing schematically apparatus for the attachment of a tube head to the tube body, the parts being shown prior to bringing them together.
Figure 8:
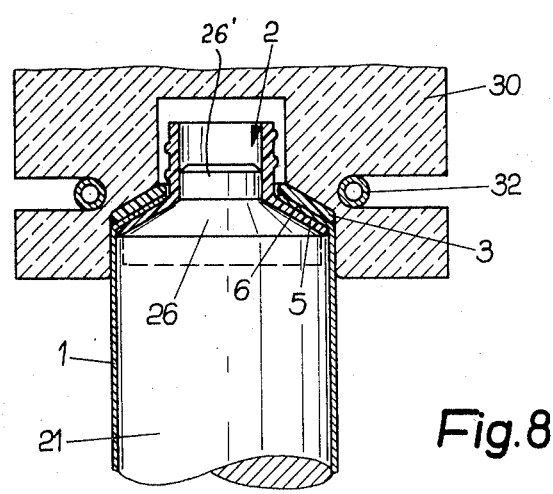
FIG. 8 is a section showing the apparatus of FIG. 7 after the parts are brought together.

For attachment of the tube head, the spindle 21, as shown in FIGS. 7 and 8, may have a reduced conical shoulder 26 on at one end terminating in a cylindrical nipple defining stub 26'. Shoulder 26 ends directly at the peripheral edge 27 of the spindle, so that the tube body 1 is formed on the spindle with the good heat conductive material of spindle 21 extending right up to edge 27. According to FIG. 7, a prefabricated tube head element 2 such as that of FIG. 1 is placed over spindle shoulder 26 with stub 26' inside the nipple 4. Tube body 1 formed to a cylinder and lying on the spindle, is pushed forward by an indicated $d$ length in FIG. 7 over the peripheral edge 27 and is then turned inwardly according to directional arrows 28 onto the outer surface of the head shoulder plate 5. Then additional shoulder element 3, preshaped in the form of a conical ring, is slipped on in the direction of arrow 29 in FIG. 7, to overlie the turned in shoulder region 6 of body 1.

After the individual parts have been assembled in this manner, the coaxial heated pressure die 30 is moved in the direction of arrow 31 of FIG. 7 toward the spindle 21, and the tube elements are unitarily surface bonded under combined heat and pressure on the spindle. Pressure die 30 in the example shown contains an induction loop 32 which, as soon as it is energized, heats shoulder 5 of the tube head, the turned in shoulder region 6 of the tube body 1 and additional shoulder element 3 to weld them all together upon their coextensive surface areas, as shown in FIG. 8.

Pressure die 30 also may consist of a block of ceramic material or heat resistant plastic mounting the induction loop. It is also possible to arrange induction loop 32 separately from pressure die 30 above a guide path for spindle 21, so that the assembled tube elements on spindle 21 with a pressure stamp 30 on it and moving along with it are moved through the induction field, the induction coil itself being fixed. The tube body and head structures are similarly assembled in FIGS. 1 and 3.

For the connection of tube body 1 with tube head 9 in FIG. 2, the tube body end projecting over the head 26 is longer than the length d of FIG. 7, so that the tubular body end may be formed to lie on shoulder 26' and further to extend as liner nipple 8' (see FIG. 2) up into head 9 when the head is placed on the spindle end. Then the formed tube body end and head 9 are unitarily fused by die 30 as in FIGS. 7 and 8.

For producing the structure of FIG. 4, the additional shoulder element 12 is placed on spindle shoulder 26 before the upper edge of the tube body 1 is turned in over it to form the tube shoulder region 6. Then tube head 13 is placed upon the assembly and the parts are welded under heat and pressure by die 30.

For producing the structure of FIG. 5, nipple bushing 16 is first slipped onto the stub 26' projecting from spindle shoulder 26 and the formed tube body is advanced beyond shoulder edge 27 by a distance equal to the length indicated at 15 in FIG. 5. Then headpiece 17 is put in place as shown in FIG. 5, and the parts are welded or fused under heat and pressure by die 30.

In every case, the heat required for the surface bonding of the head piece of the tube with tube body 1 will be exerted substantially only mainly in the area of the headpiece of the tube, especially at the shoulder region. Adjacent shoulder 27 heat will be absorbed by the metal surface of spindle 21 and will thus be conducted away by spindle 21, so that even in the immediate vicinity of the welding region of the body to the tube head, there is no combustion or deterioration of the tube body.

In many instances it is desirable to close the tube even during its manufacture at the end away from the tube head, as by a transverse welding seam. FIGS. 9 and 10 show schematically arrangements for producing such a welded end seam. For this purpose, a pressure die 34 made of ceramic material or some heat resistant plastic such as tetrafluoroethylene, and containing the energizing electrode 33 is provided. Electrode 33 is shown as an induction loop having a side extending transversely across the entire side of the tube body. For the purpose of cooling by water the loop is hollow. Loop 33 fits with one of its legs pressed directly against an outside surface of the flattened end of tube body 1.

A support 35 of a good heat conductive material such as aluminum, having large heat capacity, is provided for counter pressure. Block 35 immediately conducts away heat created along the welding seam and in the immediate vicinity of the welding seam and absorbs it, so that no tube body combustion will occur even at the transverse welding seam. Whenever tube body 1 is formed from a foil blank with a longitudinal seam as in FIG. 6, this longitudinal seam should encounter the transverse seam shown being formed in FIGS. 9 and 10 about in the middle of the transverse seam. For this purpose, block 35 can be provided with a thin rubber coating 36, into which the longitudinal seam of the tube body 1 is impressed when the block 35 and die 34 are brought together under pressure. This guarantees efficient welding pressure in the transverse seam even in the area of the longitudinal seam and at both sides of the longitudinal seam. The rubber coating 36 should however be as thin as possible so as not to interfere with heat conduction at this region.

FIG. 10 shows a variation of the arrangement for producing the transverse seam. In this case a somewhat smaller aluminum support block 37 is provided as a counter pressure element, and block 37 is provided on the side facing the pressure die 34 with an elastic coating, such as a rubber layer 38. Between this rubber layer 38 and tube body 1, a thin copper strip 39 is inserted which produces even distribution of the welding heat and simultaneously carries off excess heat directly to the aluminum block 37.

We claim:

1. A method for the production of container tubes comprising forming laminated sheet material containing at least one internal layer of metal and outer plastics layers at opposite sides of the metal layer into a tubular body having an inturned annular shoulder region at one end, providing a prefabricated head of synthetic plastics material having a shoulder region and a projecting nipple, and assembling said head and body with said shoulder regions pressed together in surface engagement and pressing a ring shaped shoulder element against said tube body shoulder opposite the head shoulder region while welding said head, body and ring element together at said shoulder regions by inductively heating said metal layer and at the same time draining away welding heat transferred along said metal layer adjacent said regions.

2. A method for the production of container tubes comprising forming laminated sheet material containing at least one internal layer of metal and outer plastics layers at opposite sides of the metal layer into a tubular body having an inturned annular shoulder region and a nipple at one end, providing a prefabricated head of synthetic plastics material having a shoulder region and a projecting nipple and assembling said head and body with said shoulder regions pressed together in surface engagement and said body nipple extending within the head nipple while welding said head and body together at said shoulder regions by inductively heating said metal layer and at the same time draining away welding heat transferred along said metal layer adjacent said regions and while surface bonding said nipples together.

3. The method defined in claim 2, wherein an annular bushing of thermoplastic material is inserted within said head nipple and surface bonded to both nipples.

References Cited

UNITED STATES PATENTS

| 3,074,837 | 1/1963 | Flax | 156—69 |
| 2,539,154 | 1/1951 | Nisser, Jr. | 222—107 |
| 3,346,435 | 10/1967 | Beck | 156—69 |
| 3,144,964 | 8/1964 | Goff et al. | 222—107 X |
| 3,356,552 | 12/1967 | Pearl | 156—69 |
| 3,381,818 | 5/1968 | Cope et al. | 222—107 X |
| 3,260,410 | 7/1966 | Brandt et al. | 156—69 X |
| 3,186,601 | 6/1965 | Marchak | 222—107 |
| 3,460,310 | 8/1969 | Adcock et al. | 156—272 X |

CARL D. QUARFORTH, Primary Examiner

E. E. LEHMANN, Assistant Examiner

U.S. Cl. X.R.

156—198, 203 272, 275, 306, 311; 222—107

UNITED STATES PATENT OFFICE
CERTIFICATE OF CORRECTION

Patent No. 3,700,513　　　　　　　　Dated October 24, 1972

Inventor(s)　　　K. Haberhauer et al

It is certified that error appears in the above-identified patent and that said Letters Patent are hereby corrected as shown below:

Column 3, line 62, change "heated" to --head--.

Column 3, line 68, delete -- ex- --.

Column 3, delete line 69; line 70, delete "likewise".

Column 3, line 71, after "blank" add a period.

Column 5, line 13, change "colsely" to --closely--.

Signed and sealed this 10th day of April 1973.

(SEAL)
Attest:

EDWARD M. FLETCHER, JR.　　　　　　　ROBERT GOTTSCHALK
Attesting Officer　　　　　　　　　　Commissioner of Patents